United States Patent
Lee et al.

(10) Patent No.: US 8,847,894 B1
(45) Date of Patent: Sep. 30, 2014

(54) PROVIDING TACTILE FEEDBACK INCIDENT TO TOUCH ACTIONS

(75) Inventors: Woojae Lee, Manhattan, KS (US);
Sanjay K. Sharma, Olathe, KS (US);
Peter S. Syromiatnikov, Overland Park, KS (US); Cesar Perez, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1024 days.

(21) Appl. No.: 12/711,900

(22) Filed: Feb. 24, 2010

(51) Int. Cl.
*G06F 3/045* (2006.01)

(52) U.S. Cl.
USPC ........... 345/173; 345/172; 345/174; 345/169; 345/175; 345/176; 345/177; 345/178; 178/18.01; 178/18.02; 178/18.03; 178/18.04; 178/18.05; 178/18.06; 178/18.07; 178/18.08; 178/18.09; 178/19.01; 178/19.02; 178/19.03; 178/19.04; 178/19.05; 178/19.06

(58) Field of Classification Search
CPC ..... G06F 3/041; G06F 3/0412; G06F 3/0416; G06F 3/044; G06F 3/0488; G06F 3/04883; G06F 3/017; G06F 3/016; G06F 3/03545; G06F 3/0418; G06F 1/1692
USPC ........... 345/173–183, 169; 178/18.01–18.09, 178/18.11, 19.01–19.06
See application file for complete search history.

(56) References Cited

U.S. PATENT DOCUMENTS

| | | | |
|---|---|---|---|
| 5,977,867 A | 11/1999 | Blouin | |
| 2008/0150911 A1* | 6/2008 | Harrison | 345/173 |
| 2009/0033617 A1* | 2/2009 | Lindberg et al. | 345/156 |
| 2009/0315690 A1* | 12/2009 | Hwang et al. | 340/407.2 |
| 2009/0315830 A1 | 12/2009 | Westerman | |
| 2011/0128236 A1* | 6/2011 | Faubert | 345/173 |

FOREIGN PATENT DOCUMENTS

WO  WO 2009155952 A1 * 12/2009 ............. G06F 3/048

* cited by examiner

*Primary Examiner* — Olga Merkoulova

(57) ABSTRACT

A method, system, and medium are provided for providing tactile feedback in association with contact to a touchscreen display of a mobile device. One embodiment of the method includes receiving a touch input to a touchscreen display area provided by a user of the mobile device. The touch input selects a predetermined region within the touchscreen display area. Incident to the touch input of the predetermined region, a mechanical indicator on the rear of the mobile device is physically manipulated to provide an indication to the user that the predetermined region was selected by the user.

19 Claims, 8 Drawing Sheets

PROVIDING TACTILE FEEDBACK INCIDENT TO TOUCH ACTIONS

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a set of computer-useable instructions provide a method of providing tactile feedback in association with touchscreen displays of mobile devices. The method includes providing predetermined regions within a touchscreen display of a mobile device. Each of the predetermined regions corresponds with an operation or a functionality. One of the predetermined regions selected by a user via the touchscreen display is recognized. A mechanical indicator to physically manipulate is identified based on the predetermined region selected by the user. The mechanical indicator is physically manipulated on a rear side of the mobile device to provide physical feedback indicating the one of the at least one predetermined region selected by the user via the touch screen display.

In a second aspect, a set of computer-useable instructions provide a method of providing tactile feedback in association with touchscreen displays of mobile devices. The method includes receiving a touch input to a touchscreen display area provided by a user of a mobile device. The touch input selects a predetermined region within the touchscreen display area. Incident to the touch input of the predetermined region, a mechanical indicator on a rear portion of the mobile device is physically manipulated. The physical manipulation provides an indication to the user that the predetermined region was selected by the user.

In another aspect, a mobile communications device includes a touchscreen display that presents a graphical user interface that includes a plurality of predetermined regions. Each of the plurality of predetermined regions is associated with an item displayed via the touchscreen display. The mobile communications device also includes contact sensors that detect contact provided to a predetermined region within the touchscreen display. One or more processors facilitate recognizing the contacted predetermined region, identifying a mechanical indicator corresponding with the contacted predetermined region, and initiating a physical manipulation of the mechanical indicator located on a rear portion of the mobile communications device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended for the purpose of providing an easy methodology of communicating the ideas expressed herein and are not meant to limit the scope of the present invention.

Further, various technical terms are used throughout this description. An illustrative resource that fleshes out various aspects of these terms can be found in Newton's Telecom Dictionary by H. Newton, 24$^{th}$ Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
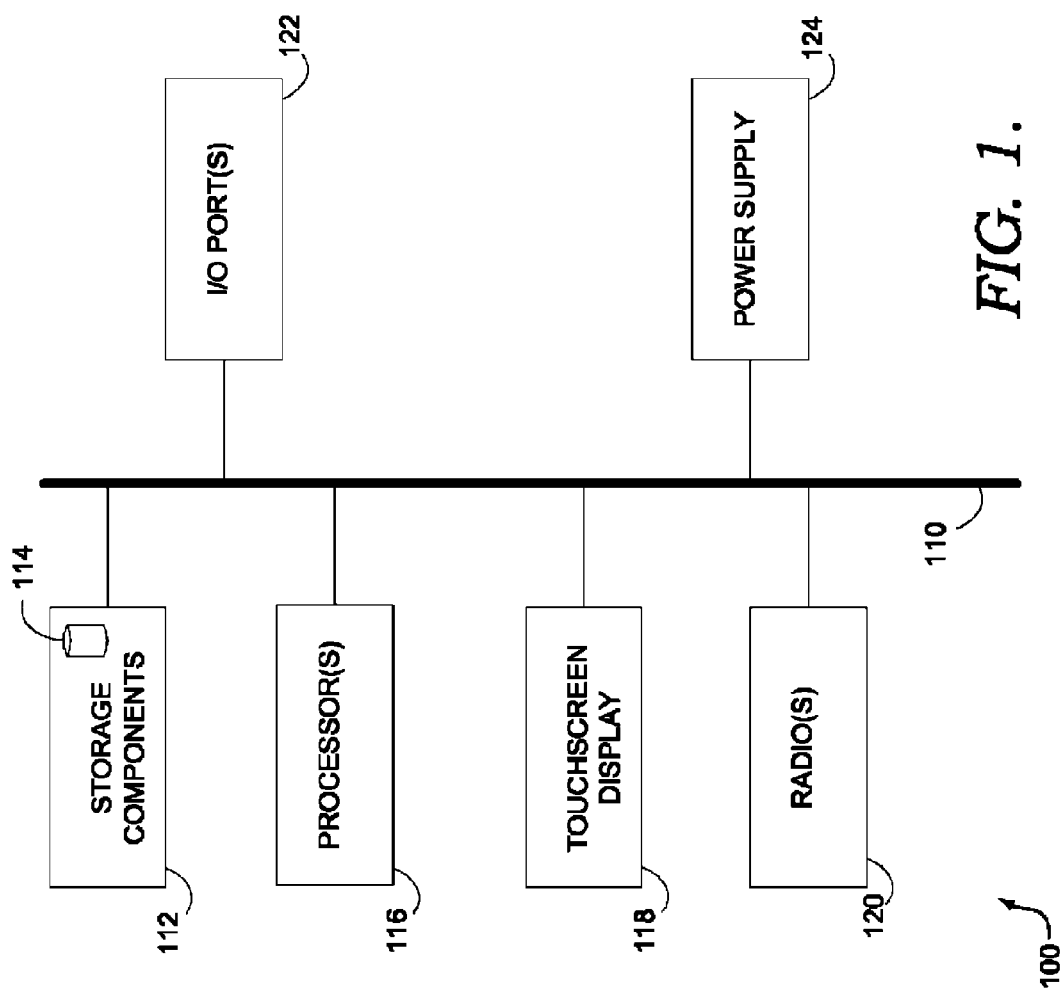
FIG. 1 is a block diagram of an exemplary mobile device that is suitable for operation of an embodiment of the present invention.

FIG. 1 depicts an illustrative block diagram of a mobile device that is suitable for operation of an embodiment of the present invention. Throughout this disclosure, reference will be made to a mobile device, such as in FIG. 2A-2B. FIG. 1 depicts a selection of components that will generally be included in the mobile device to help facilitate various functional aspects of embodiments of the invention. As shown, a bus 110 couples, directly or indirectly, the following illustrative components: a storage component 112, a processor 116, a touchscreen display 118, a radio 120, input/output ports 122, and a power supply 124.

Storage components 112 may take the form of the aforementioned computer-readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within mobile device 100. A portion or separate storage component includes database 114. In one embodiment, as will be explained in greater detail below, database 114 can be used to store associations of predetermined regions and corresponding mechanical indicators.

Processors 116 facilitate a flow of information among all or a portion of the components shown in FIG. 1 as well as computer-usable instructions that help facilitate various aspects of the present invention. For example, in one embodiment, an operating system of mobile device 100 also helps coordinate various functional aspects of the present invention. Processors 116 operate in connection with running such an operating system.

Touchscreen display 118 provides one avenue of inputting data into device 100. In one embodiment, touchscreen display 118 takes the form of a resistive touch screen, but in some embodiments, it might be capacitive. Touchscreen display 118 receives input by way of touch actions that cause an object to come in contact with touchscreen display 118. An illustrative example includes a user utilizing his or her finger to tap or use some other form of touch action to interact with mobile device 100. Other items such as a stylus, fingernail, etc. may be used to provide input to mobile device 100 by way of touchscreen display 118. Other illustrative touch actions include a sliding motion as well as multipoint touches.

Radios 120 facilitate the communication of wireless communication signals to and from mobile device 100. Illustrative protocols that can be utilized in connection with an embodiment of the present invention include CDMA, TDMA, GSM, GPRS, EVDO, etc. The radios facilitate wireless communications between the device and a national or even global telecommunications network.

Input/output ports 122 provide a way for mobile device 100 to interact with other peripheral components. Illustrative input/output ports include an ear-piece or headphone jack, a USB port, an infrared port, and the like. Different input/output ports could be provided as needed to facilitate communication of other peripheral components.

Power supply 124 may also take on a variety of forms ranging from a battery to a charging mechanism to other forms of power sources that serve to provide power to mobile device 100.

The selected components of mobile device 100 are meant to be illustrative in nature, and the various lower-level details of the components are not elaborated on so as to not obscure the present invention. Clearly, some of the components may be absent in some embodiments of the present invention, and additional components not shown may also be part of mobile device 100. Attempting to show all of the various components of mobile device 100 would obscure certain novel aspects, and we will refrain from such elaboration at least for the sake of brevity.

An aspect of an embodiment of the present invention includes providing tactile feedback using mechanical indicators on the rear of a mobile device. A mobile device may include, without limitation, a mobile communications device (e.g., a mobile phone), a personal digital assistant (PDA), an MP3 player, any portable device, any combination of these devices, or any other mobile device. In embodiments, a mobile device includes any mobile device having a touchscreen display area on the front side of the mobile device and one or more mechanical indicators on the rear side of the mobile device.

A mechanical indicator, as used herein, refers to any indicator that mechanically provides tactile feedback to a user. In embodiments, a mechanical indicator might resemble a button or key that depresses or protrudes to provide tactile feedback to a user. As can be appreciated, a mechanical indicator can take on any shape and size. In some cases, mechanical indicators on the rear of a mobile device might take on multiple shapes and/or sizes. For example, each mechanical indicator on the rear of a mobile device might take on a distinct shape and/or size. A mechanical indicator might function using an actuator, for example, such as a pneumatic actuator, a hydraulic actuator, or an electric actuator. Accordingly, an actuator might convert energy (e.g., transported by air, electric current, or liquid) into a motion that manipulates a mechanical indicator, for example, by depressing, protruding, vibrating, or otherwise physically manipulating the mechanical indicator.

Tactile feedback refers to feedback provided to a user that is perceptible to the touch. In this regard, one or more mechanical indicators are positioned on the rear side of a mobile device to provide feedback to a user that has a hand, or a portion thereof, placed on the rear of the mobile device. In operation, tactile feedback is a physical response provided to a user in reaction to the user's selection of a predetermined region in association with a touch screen of a mobile device. Tactile feedback provides a user with a verification or a confirmation that a predetermined area, or an item associated therewith, was selected. Alternatively or additionally, tactile feedback provides a user with information pertaining to a user's selection of a predetermined area or item associated therewith. For example, tactile feedback can provide a user with an indication of accuracy of selection of a predetermined area, or an item associated therewith. Without such tactile feedback, a user may be unsure if a particular predetermined area or item was selected. Accordingly, embodiments described herein provide tactile feedback to a user such that the user is notified of selection of a predetermined area or item in association therewith.

By way of example only, assume a user is using a touch screen of a mobile device to input information or data (e.g., a phone number). Further assume that the user intends to select a virtual key "1" displayed in a modal keypad. In such a case, upon the user's selection of the virtual key "1," the user is provided with tactile feedback in response to the user selection to indicate that the virtual key "1" was indeed selected. As previously discussed, the tactile feedback might be provided by way of mechanical indicators positioned on the rear of the mobile device that protrude, depress, or otherwise provide a physical indication that virtual key "1" was selected by the user. In some cases, one or more mechanical indicators might be manipulated to indicate that a virtual key was selected. In other cases, one or more mechanical indicators might be manipulated to indicate that a specific virtual key (i.e., "1") was selected. The mechanical indicator manipulated to indicate a selection of a specific virtual key (i.e., "1") might be chosen based on a location of a mechanical indicator that corresponds with a location of the virtual key (e.g., relative to mobile device, or a portion thereof, or relative to other virtual keys and/or mechanical indicators).

Figure 2B:
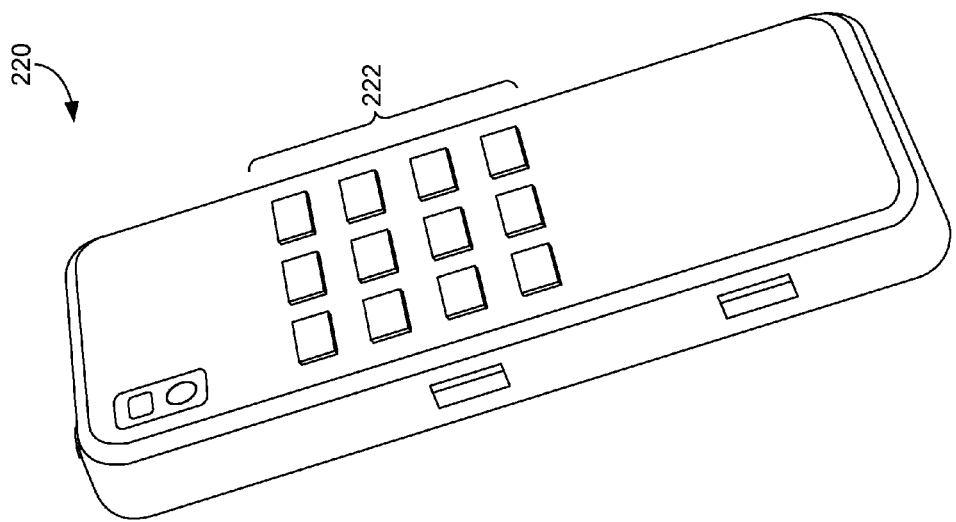
FIGS. 2A and 2B provide an overview of an illustrative mobile device suitable for practicing embodiments of the present invention.
Figure 2A:
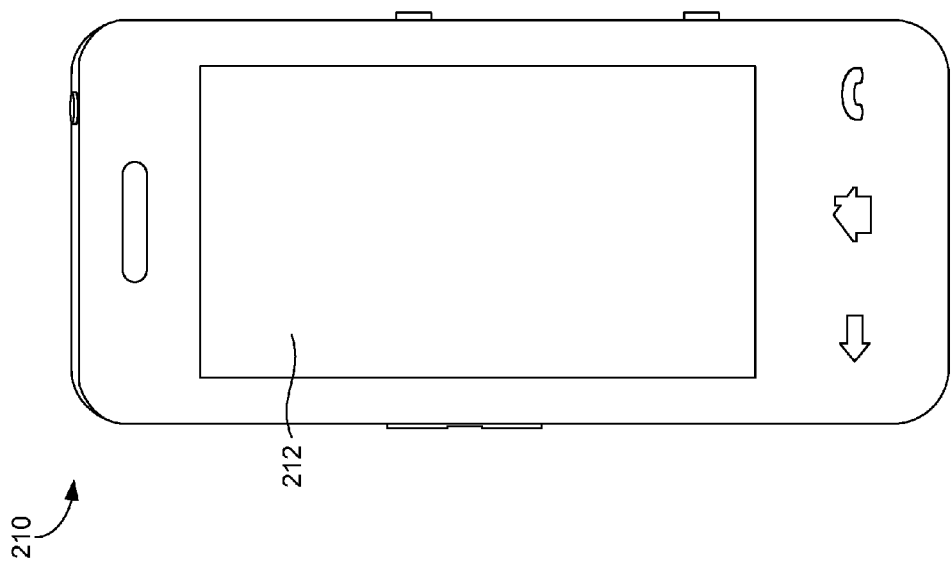

Turning now to FIG. 2A, a representation of a front portion of a mobile device is provided and referenced generally by the numeral 210. The front portion of mobile device 210 includes a display 212, which in one embodiment is a touchscreen display that is able to receive input by way of touch actions or interactions. The front portion of mobile device 210 can provide any number, placement, size, etc. of predetermined regions. Touchscreen display 212 may be adapted to receive any number of types of touch actions such as single touches, taps, slides, or other gestures. Additionally, in various embodiments, touchscreen display 212 may be adapted to receive multiple simultaneous touch actions that may generate a type of input distinct from input generated by a single touch action. The front portion of mobile device 210 can include any number of mechanical buttons or push buttons used to select or to input information in addition to or in alternative to input via the touchscreen display 212. Such mechanical buttons or push buttons can be used by a user to provide alternative or additional data or selections.

Touchscreen display 212 includes one or more predetermined regions (not shown). A predetermined region refers to a region or area of a touchscreen display that corresponds with a particular operation or functionality. In this regard, in response to a touch action applied to a specific predetermined region, a corresponding operation or function is performed. By way of example, assume that a user selects, via finger contact, a predetermined region that is associated with closing a window that is presented within a touchscreen display of a mobile device. In such a case, upon the user contact with the predetermined region, the window is closed.

Figure 4:
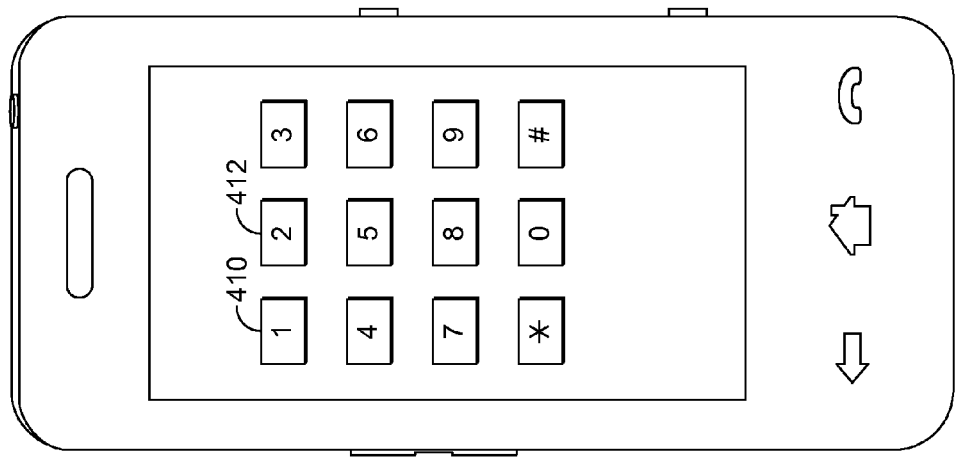
FIG. 4 depicts predetermined regions corresponding with items displayed within a touchscreen display of a mobile device in accordance with embodiments of the present invention.
Figure 3:
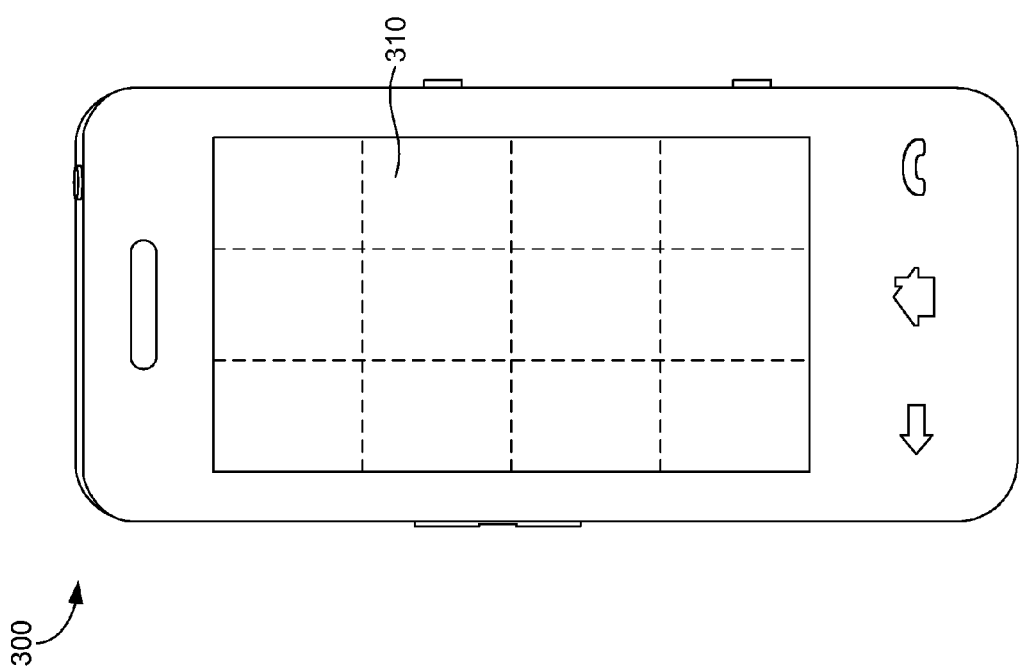
FIG. 3 depicts a set of predetermined regions within a touchscreen display of a mobile device in accordance with embodiments of the present invention.

A touchscreen display can have any number of predetermined regions. For instance, the entire touchscreen display can make up a single predetermined region. That is, a predetermined region is selected if a touchscreen display is contacted by a user at any location of the touchscreen display. A touchscreen display might alternatively include a grid-pattern of predetermined regions. In this regard, squares, rectangles, circles, or any other shape or predetermined regions 310 in association with a mobile device 300 can be aligned in rows and columns, as illustrated in FIG. 3. In another embodiment, predetermined regions might correspond with items of content presented to a user via the touchscreen display. For instance, one or more predetermined regions might be aligned or correspond with items, such as letters, text, words, numerals, symbols, icons, etc., presented on the touchscreen display. With reference to FIG. 4, a first predetermined region 410 corresponds with the virtual key "1" while a second predetermined region 412 corresponds with the virtual key "2."

Figure 6:
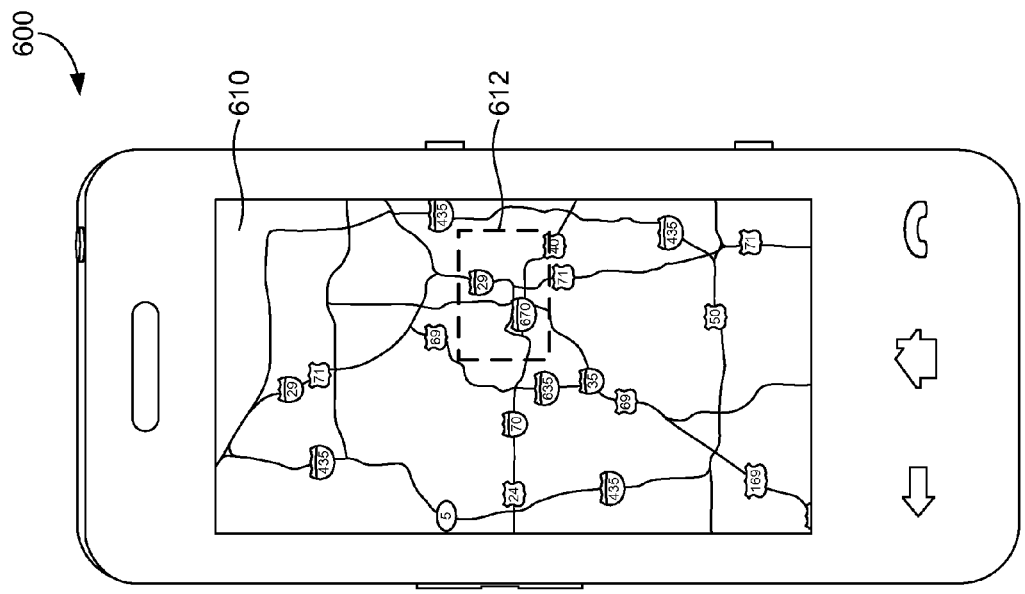
FIG. 6 depicts a second unidentifiable predetermined region, in accordance with embodiments of the present invention.
Figure 5:
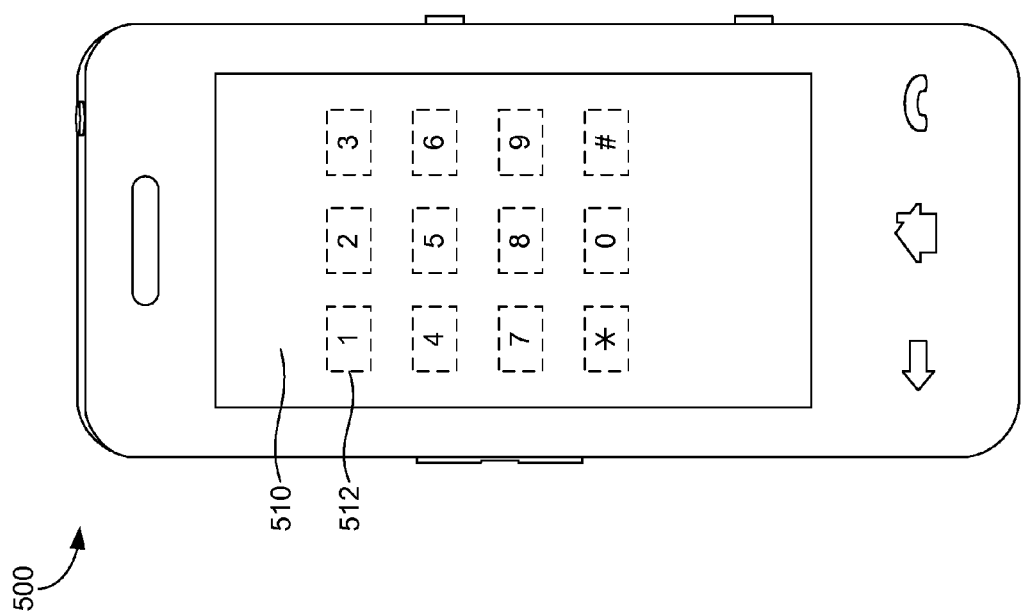
FIG. 5 depicts a first unidentifiable predetermined region, in accordance with embodiments of the present invention.

As can be appreciated, in some embodiments, an area of a predetermined region(s) is invisible or unidentifiable to a user. FIGS. 5 and 6 illustrate predetermined regions that are not visible to a user. In FIG. 5, a modal keypad, including a number "1," is displayed on a touchscreen display 510 of mobile device 500. Although not visible to a user, a predetermined region 512 corresponds with the displayed number "1." The invisible predetermined region 512 is outlined in dotted lines in FIG. 5 to illustrate the location of the predetermined region, but such an outline is not visible to a user. Although an item or representation of the predetermined region is visible to the user (i.e., the number "1"), the actual area of the predetermined region is not delineated to the user.

In FIG. 6, a geographical map is displayed on the touchscreen display 610 of mobile device 600. Although not visible to a user, predetermined region 612 corresponds with the center of the map presented to the user. The invisible predetermined region 612 is outlined in dotted lines to illustrate the location of the predetermined region, but such an outline is not visible to a user. Again, the actual area of the predetermined region is not delineated to the user. In implementation, assuming that a user contacts any portion of the predetermined region 612, the map might zoom into the area or provide another functionality. Although FIG. 6 illustrates only a single predetermined region 612 for clarity purposes, any number of predetermined regions can be included within the touchscreen display. For example, invisible predetermined regions can be structured in a grid-pattern across the display screen.

Figure 7:
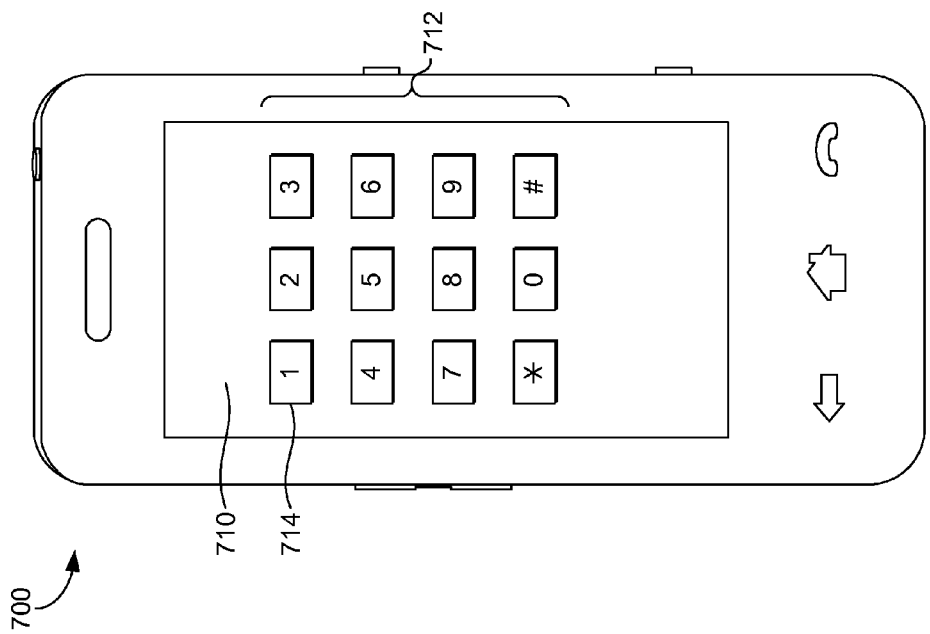
FIG. 7 depicts identifiable predetermined regions, in accordance with embodiments of the present invention.

Conversely, in some embodiments, a predetermined region(s) is visible or identifiable to a user. FIG. 7 illustrates predetermined regions that are visible to a user. In FIG. 7, a modal keypad 712, including a number "1," is displayed on a touchscreen display 710 of mobile device 700. The number "1" displayed on the touchscreen display is surrounded by a border 714 that indicates the predetermined region. Accordingly, a user can touch any point within the bordered area (i.e., the predetermined region) to initiate performance of a function, such as entering or inputting the number "1." Although FIG. 7 illustrates only predetermined regions in association with a modal keypad, any number of predetermined regions can be included within the touchscreen display.

Predetermined regions may be provided in any area of the touchscreen display. In an embodiment of the present invention, a predetermined region may be persistently located. That is, regardless of the content being displayed on the touchscreen display, the predetermined region (e.g., an invisible predetermined region) is located in a particular position or area. Additionally, regardless of any type of application that is running, or any other type of functionality that is being presented on display 212 of FIG. 2A, the predetermined regions might be located in the same position. For example, a touchscreen display might be separated into four predetermined regions that persist regardless of the content displayed on the touchscreen and, in some cases, regardless of application running.

In an alternative embodiment, a predetermined region(s) may be modified based on the content displayed on the touchscreen display. For example, assume that a user is using a mobile device to place a phone call and, as such, a modal keypad is displayed on the device via the touchscreen display. In such a case, a predetermined region (e.g., visible or invisible predetermined region) might correspond with each number in association with the modal keypad. Further assume that at a later time, the user is using the mobile device to view and navigate a map application or website. In such a case, a set of predetermined regions (e.g., invisible predetermined regions) might be configured in a grid-pattern arrangement in association with the touchscreen display. A placement or location of predetermined regions might be modified in accordance with a particular application, website, presented content, or the like. In this regard, a predetermined region might correspond with an item displayed on the touchscreen. An item can be any data or content presented on the touchscreen, such as, for example, an image, text, a value, a symbol, a representation, a character, and/or the like. By way of example only, assume that a search results page, including a set of search results, is presented on a touchscreen display. In such a case, an item can represent each search result, or a portion thereof.

Figure 8:
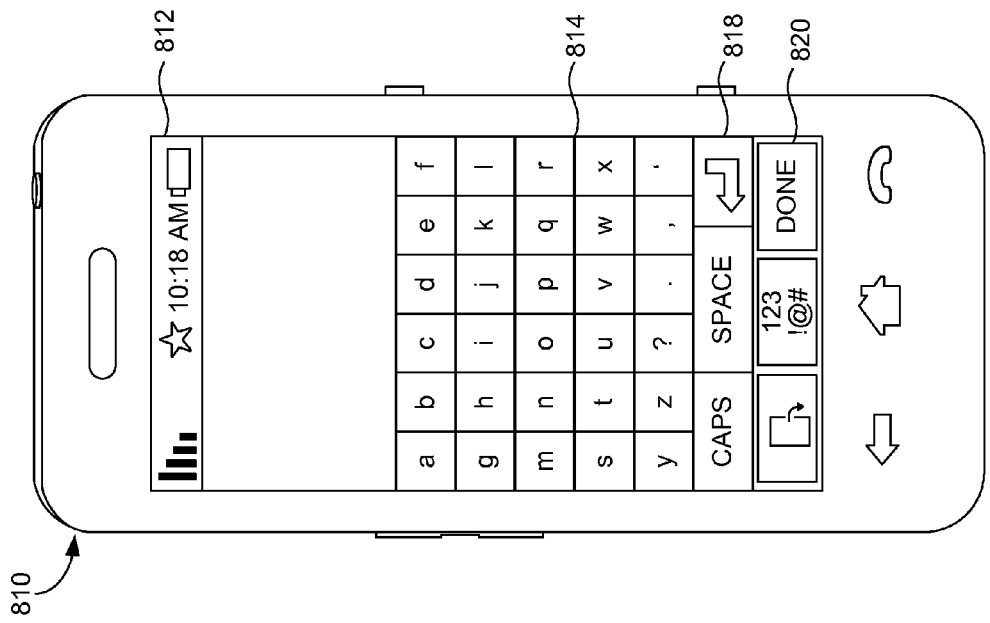
FIG. 8 depicts a modal keypad displayed within a touchscreen display of a mobile device in accordance with embodiments of the present invention.

In some cases, predetermined regions (e.g., visible or invisible) correspond with a modal keypad. With reference to FIG. 8, a touchscreen display 812 is shown to display a modal keypad 814. As used herein, a modal keypad includes a set of items that are displayed on the touchscreen display 812 of a mobile device 810, where each of the set of items represents a letter, number, punctuation mark, or other character or set of characters. The modal keypad 814 may also include other items representing buttons that have other functionality associated therewith such as, for example, a space bar, a return key, and a caps-lock button, as shown in row 818 of FIG. 8. Other such items may include, for example, a "done" button, a screen-toggle button (for toggling between different screens such as a modal keypad and a screen showing only character input), or a keypad-toggle button (such as a button for toggling between a keypad having letters to a keypad having numbers), as shown in row 820 of FIG. 8.

With continued reference to FIG. 8, modal keypad 814 may include any number of arrangements of items therein, and although we only illustrate a few of the possible configurations herein, we do not intend to limit the arrangements that other embodiments of the present invention may employ. For example, in one embodiment, modal keypad 814 may include all of the letters of an alphabet, listed in order in rows, as shown in FIG. 8. It will be appreciated by those skilled in the art, that modal keypad 814 may be provided with items representing characters of any language, including but not limited to, mathematic and scientific languages. Modal keypad 814 may, as indicated above, also be presented in any number of arrangements such as the "landscape" arrangement shown in FIG. 9.

Figure 9:
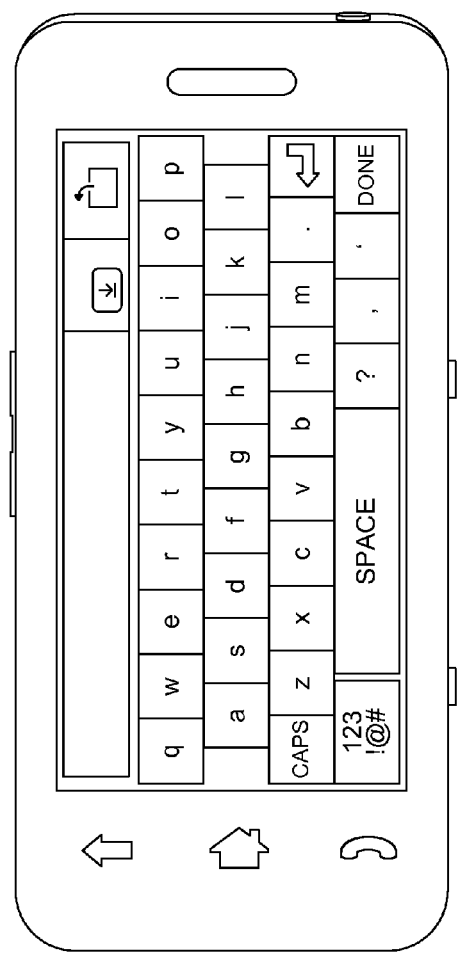
FIG. 9 depicts an example of landscape-oriented modal keypad suitable for use in implementation of various embodiments of the present invention.

In an embodiment, a modal keypad may be arranged with alphabetical characters arranged in a typical "QWERTY" keyboard fashion, as illustrated in FIG. 9. In other embodiments, some of which may include characters from languages other than English, the characters may be arranged in any number of other ways. We do not intend to limit the arrangement possibilities by the illustrations provided herein, but illustrate only a few of the possibilities.

Figure 10:
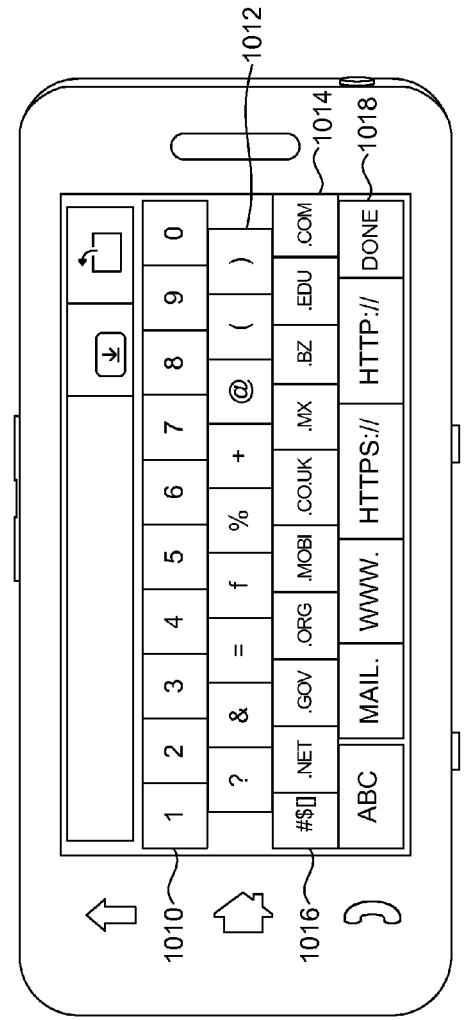
FIG. 10 depicts an exemplary set of alternative suggested character strings within a modal keypad of a mobile device in accordance with embodiments of the present invention.

Additionally, whether the modal keypad is oriented as in FIG. 8, as in FIG. 9, or in some other manner, the modal keypad may contain any type of character that may be useful as character string input. For example, FIG. 9 illustrates a modal keypad as displaying alphabetical characters (i.e., letters), and various punctuation marks. Other embodiments may include, as illustrated in rows 1010 and 1012 of FIG. 10, characters such as numerals, various symbols, or even portions of character strings, as shown in FIG. 10. In an embodiment such as the illustrative example of FIG. 10, for example, a modal keypad 1014 may include commonly used character strings such as portions of e-mail addresses (e.g., "MAIL.", ".org", ".com", etc.) or uniform resource locators, or portions, ("WWW.", "HTTP://", ".com", etc.), as shown in rows 1016 and 1018. It will be understood that any character strings or character string portions may be included in a modal keypad 1014. In some embodiments, modal keypad 1014 may be adapted to allow a user to choose the contents thereof, and may in other embodiments, allow the user to define the contents or items included.

In embodiments, a predetermined region is capable of receiving touch input. It will be appreciated by those skilled in the art that touchscreen display may include numerous areas or regions (including the entire touchscreen display) that are capable of receiving touch input, and that the functionality provided by touch input at a particular location of touchscreen display may vary, depending on particular applications, underlying operating systems, and the like. In an embodiment, a predetermined region may be configured in such a way that touch input to the predetermined region always produces the same type of functionality. For example, touch input to a particular predetermined region may always result in a presentation of a list of items.

Figure 11:
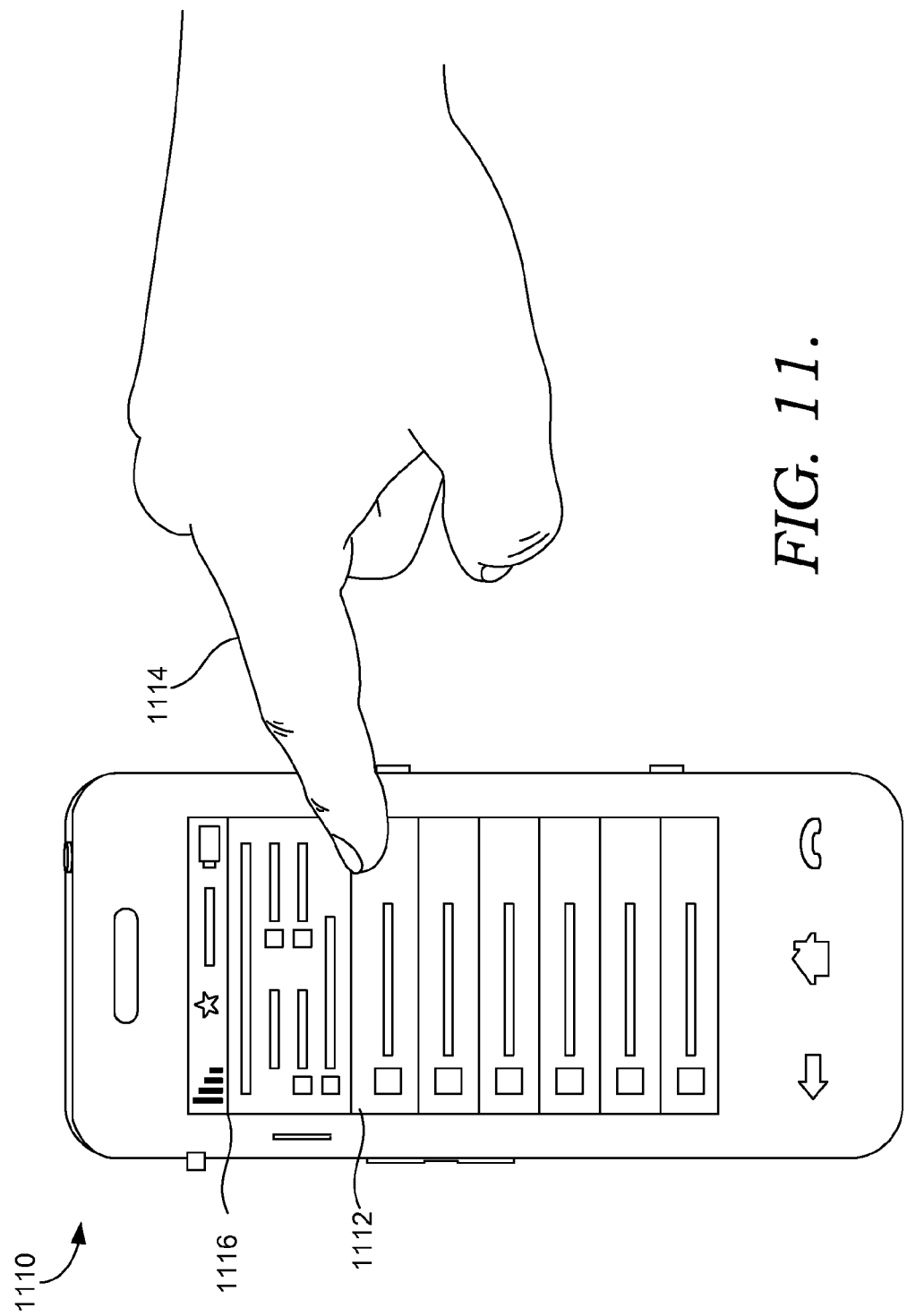
FIG. 11 depicts an example of a mobile device having predetermined regions capable of receiving touch input in accordance with embodiments of the present invention.

Turning now to FIG. 11, a mobile device 1110 is shown which includes predetermined region 1112 capable of receiving touch input. A user's finger 1114 is shown making contact with the touchscreen display 1116 in the predetermined region 1112. As described above, such a contact may be a touch input which may be received in predetermined region 1112 and may result in some functionality within the mobile device 1110 (e.g., navigating to a website in association with a particular search result). Although the illustration in FIG. 11 shows a touch input by way of contact between a user's finger 1114 and the touchscreen display 1116, we do not mean to limit the capability of touchscreen display 1116 to receiving touch input from a finger. Touchscreen display 1116 may also be capable of receiving touch input as a result of contact with another object such as, for example, a stylus. In some embodiments, touch input may be accomplished by way of any object coming into contact with touchscreen display 1116.

Upon a touch action being applied to or a touch input being received by a predetermined region of the touchscreen display of a mobile device, the particular predetermined region selected or contacted is recognized. In one embodiment, a selected predetermined region may be recognized utilizing one or more sensor points of a mobile device. In such a case, a touch action or a touch input may refer to a contact or touch with a sensor point on a mobile device, e.g., a finger or stylus touching a sensor point on a mobile phone. That is, selection of a predetermined region can be recognized in accordance with an indication of contact with a sensor point on a device.

A sensor point refers to any location on a device that can detect contact. As such, a sensor point may be a contact sensor, or a portion thereof, that detects contact in association with a touchscreen display. In embodiments, one contact sensor may be associated with each sensor point of the device, with a region or portion of the sensor points of the device, or with all sensor points of the device. As used herein, a contact sensor refers to any sensor that detects contact including, but not limited to, a pressure or displacement sensor, a bio-presence sensor, or the like. A bio-presence sensor may be any type of sensor that detects human touch, such as heat sensors, electrical conductivity measuring sensors, ultrasound sensors, or other sensors.

Sensor points may be positioned at any location on a device. In one embodiment, sensor points are positioned within a touchscreen display. For example, a user desiring to utilize a modal keypad positioned within a touchscreen display on the front portion of a mobile device, such as a mobile phone, may select numbers presented within a grid displayed on the touchscreen of the device. In such a case, sensor points may be positioned on the touchscreen display area of the device such that contact with the device may be detected. As can be appreciated, sensor points may be positioned over an entire device surface, including any key, or any portion of the device surface.

A selected predetermined region can be recognized by receiving, retrieving, identifying, or determining contact data. In an embodiment where recognition of a selected predetermined region is received or retrieved, an identification of a selected predetermined region might be received or retrieved from a contact sensor(s) associated with a sensor point(s). Such a contact sensor(s) may be configured to detect contact with a sensor point(s) of a device. A contact sensor(s) may generate a signal based on contact with a sensor point(s). In one embodiment, the signal generated by the contact sensor(s) may be communicated such that a selected predetermined region can be recognized or identified. For example, based on a sensor point(s) detecting contact, a signal from the sensor point(s) might be generated. A predetermined region can be recognized based on the signal generated from the sensor point(s).

In one embodiment, the contact sensors may be calibrated to generate a signal or communicate the signal based on a certain "profile." For example, in an instance that a contact sensor measures a certain threshold temperature or conductivity, the contact sensor may generate a signal and communicate the signal for identification of a selected predetermined region. On the other hand, if the contact sensor does not measure the certain threshold temperature or conductivity, the contact sensor may fail to generate the signal or communicate the signal. In one embodiment, the contact sensors may be configured to generate signals based on direct human touch of a sensor point, or touch through a thin object, such as glove liners or the like. Alternatively or additionally, contact sensors might generate signals based on contact from an object, such as a stylus.

In an embodiment where a particular predetermined region is identified or determined, a contact sensor may be utilized to identify or determine a selected predetermined region. For example, a contact sensor may generate and communicate a signal upon detecting contact. Such a signal may, thereafter, be used to identify or determine a selected predetermined region. For example, the signal may provide an indication of the location or pressure of the contact, which may then be used to identify the contact location or pressure based on the signal received from the contact sensor.

As one skilled in the art can appreciate, the sensitivity of the contact sensors affect when a human touch condition is registered. The contact sensors may be configured to avoid a situation where, for instance, a user's skin through their pants leg is sensed as a human touch condition (e.g., by registering heat or electrical conductivity of the skin).

Upon recognizing a particular predetermined region that is selected via a touch action, a mechanical indicator associated with the predetermined region is identified. In embodiments, a mechanical indicator provides an indication, via mechanical means, to a user at the rear of a mobile device that a particular predetermined region was selected thereby providing tactile feedback of a user's selection to the user. Such a mechanical indicator can provide an indication to a user in any manner including, for example, a protrusion or depression of a button or similar feature. One or more mechanical indicators are positioned on the rear of a mobile device to provide tactile feedback to the user. In this regard, a user that has a hand, or a portion thereof, placed around the rear portion of the mobile device, can receive tactile feedback indicating selection of a predetermined area associated with the touchscreen display on the front portion of the mobile device.

With reference to FIG. 2B, a representation of a rear view or back view of a mobile device is provided and referenced generally by the numeral 220. The rear portion of mobile device 220 includes a set of mechanical indicators 222 placed on the rear side of mobile device 220. The mechanical indicators can be manipulated to physically indicate a selection of a predetermined region on a touchscreen display located at the front side of a mobile device. The rear portion of mobile device 220 can provide any number, placement, size, etc. of mechanical indicators. The mechanical indicators can be adapted to provide any physical manipulation that notifies a user of the manipulation. For example, a mechanical indicator might protrude, depress, vibrate, etc. The rear portion of mobile device 220 can include any other features on the rear of the device, such as features associated with a camera (e.g., a lens or flash).

A predetermined region can be associated with a mechanical indicator in a one-to-one manner, a one-to-many manner, or a many-to-one manner. In a one-to-one manner, for each predetermined region within the touchscreen display on the front portion of a mobile device, the rear portion of the mobile device includes a corresponding mechanical indicator. In a one-to-many manner, for each predetermined region within the touchscreen display on the front portion of a mobile device, the rear portion of the mobile device includes multiple mechanical indicators. Conversely, in a many-to-one manner, multiple predetermined regions within the touchscreen display area on the front portion of a mobile device correspond with a single mechanical indicator.

One or more predetermined regions can be associated with one or more mechanical indicators in any manner. Generally, mechanical indicators are associated with predetermined regions in a manner that can instinctively or intuitively provide a user with an indication or notice of particular predetermined regions selected. For example, a predetermined region might be associated with a mechanical indicator based on the position, size, shape, etc. of the predetermined region and/or the mechanical indicator. As can be appreciated, a placement or position of a predetermined region and a corresponding mechanical indicator might align to provide an indication to a user of the particular predetermined region selected. In this regard, placement of a mechanical indicator on the rear side of a mobile device that is similar (e.g., relative to the mobile device, or portion thereof, relative to a key(s) and/or mechanical indicator(s), etc.) to placement of a predetermined region on the front side of the mobile device can result in an association between the similarly placed features (e.g., relative to other features).

By way of example only, assume that a predetermined region is associated with the numeral "1" and is positioned in the upper left-hand corner of the touchscreen display (as viewed from the front view). In such a case, a mechanical indicator associated or corresponding with that particular predetermined region is positioned in the upper left-hand corner of the touchscreen display (as viewed from the rear view). In this regard, upon a user selection of the predetermined region associated with the numeral "1," the corresponding mechanical indicator can depress or protrude providing an indication to the user, via tactile feedback provided to the user's hand, that the numeral "1" was selected on the touchscreen. To a user, physical manipulation of a mechanical indicator may feel as if the user is pushing a virtual key that extends through the device and protrudes in the rear of the device.

In embodiments, associations provided between predetermined regions and mechanical indicators can be stored, for example, in a data store. Such associations may be recognized using a lookup system or an index. Alternatively, associations provided between predetermined regions and mechanical indicators can be dynamically identified using an algorithm, or the like.

Upon identifying a mechanical indicator(s) associated with a predetermined area(s), manipulation of the mechanical indicator(s) is initiated. That is, depressing, protruding, or otherwise manipulating an identified mechanical indicator is initiated such that the mechanical indicator is manipulated. In this regard, manipulation of a particular mechanical indicator is provided incident to receiving touch input in a particular predetermined region. In some cases, manipulation of a mechanical indicator provides an indication to a user that a predetermined region(s) has been selected by the user. Alternatively or additionally, manipulation of a mechanical indicator provides an indication to a user of a particular predetermined region selected or an indication of one of a set of predetermined regions selected by the user. As can be appreciated, mechanical indicators can be manipulated in real-time. That is, a user can recognize the physical manipulation simultaneously, or near simultaneously, to selecting a predetermined region.

Figure 12:
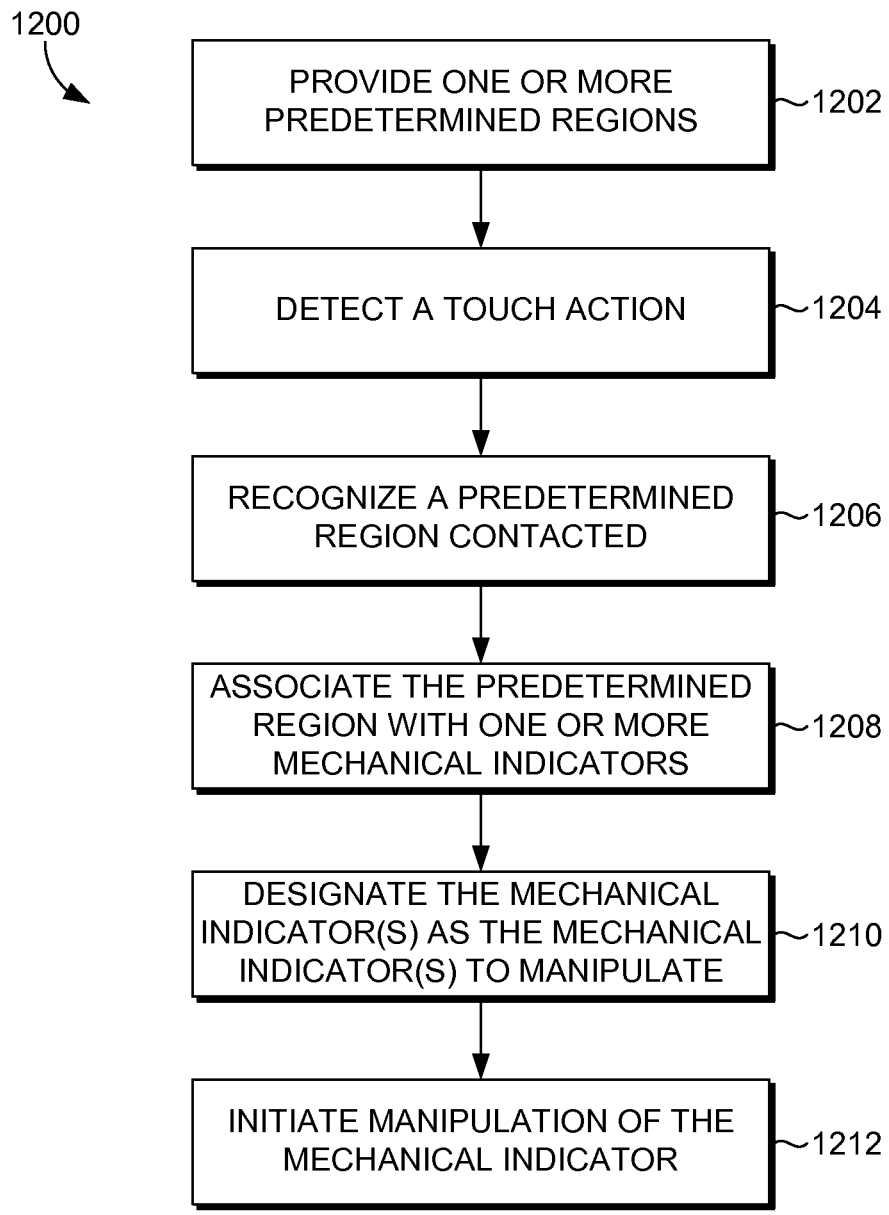
FIG. 12 depicts an illustrative method for providing tactile feedback using mechanical indicators on a rear portion of a mobile device, in accordance with embodiments of the present invention.

Turning now to FIG. 12, a flow diagram is shown illustrating a method 1200 for providing tactile feedback using mechanic indicators on rear of a mobile device, in accordance with an embodiment of the present invention. Initially, as indicated at block 1202, one or more predetermined regions are provided in association with a touchscreen display of a mobile device. Any number of predetermined regions can be provided in various embodiments of the invention. In some cases, predetermined regions might be visible or identifiable to a user while, in other cases, predetermined regions might be invisible or unidentifiable to the user. In either case, a predetermined region can correspond with an item being displayed on the touchscreen. At block 1204, a touch action provided by a user is detected. A touch action might be detected, for example, using a contact sensor that detects contact based on pressure, temperature, etc. At block 1206, a predetermined region that was contacted or selected by the user is recognized. The selected predetermined region is associated with one or more mechanical indicators positioned on the rear of the mobile device. This is indicated at block 1208. At block 1210, the mechanical indicator(s) associated with the selected predetermined region is designated as the mechanical indicator(s) to manipulate. Manipulation of the mechanical indicator is initiated at block 1212. Manipulation of the mechanical indicator can result in a protrusion, depression, or other physical manipulation of the mechanical indicator (e.g., a button/key shaped component) on the rear portion of the mobile device to provide tactile feedback to the user indicating contact with a predetermined area or item and/or the particular predetermined area or item contacted. In embodiments, a user's palm placed on the rear side of the mobile device recognizes the manipulation of the mechanical indicator. Physical manipulation of a mechanical indicator enables a user to confirm or verify that selection of a predetermined region, or item in association therewith, was detected or that a particular predetermined region was selected.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need be carried out or need to be carried out in the specific order described.

The invention claimed is:

1. One or more non-transitory computer-readable media having computer-useable instructions embodied thereon for performing a method of providing tactile feedback in association with touchscreen displays of mobile devices, the method comprising:
   providing at least one predetermined region within a touchscreen display of a mobile device, the at least one predetermined region corresponding with an operation or a functionality;
   recognizing one of the at least one predetermined regions selected by a user via the touchscreen display on a front side of the mobile device; and
   identifying a mechanical indicator to physically manipulate based on the predetermined region selected by the user, wherein the mechanical indicator is positioned on the rear side of the mobile device in a location aligned with the one of the at least one predetermined region such that the user can identify which of the at least one predetermined region was selected based on the physical manipulation of the corresponding mechanical indicator.

2. The media of claim 1 further comprising associating the one of the at least one predetermined region selected by the user with the mechanical indicator to physically manipulate.

3. The media of claim 1 further comprising initiating the physical manipulation of the mechanical indicator.

4. The media of claim 1, wherein each of the at least one predetermined region corresponds with an item displayed on the touchscreen display.

5. The media of claim 4, wherein each item comprises a number, a letter, text, a character, a symbol, an image, or a combination thereof.

6. The media of claim 1, wherein each of the at least one predetermined region is identifiable by a user.

7. The media of claim 1, wherein each of the at least one predetermined region is invisible to a user.

8. The media of claim 1, wherein each of the at least one predetermined region is selected by a user via a user touch or a stylus.

9. The media of claim 1, wherein one or more contact sensors are used to recognize the one of the at least one predetermined regions selected by the user.

10. One or more non-transitory computer-readable media having computer-useable instructions embodied thereon for performing a method of providing tactile feedback in association with touchscreen displays of mobile devices, the method comprising:
    receiving a touch input to a touchscreen display area provided by a user of a mobile device, the touch input selecting a predetermined region within the touchscreen display area on a front portion of the mobile device; and
    incident to the touch input of the predetermined region, physically manipulating a mechanical indicator on a rear portion of the mobile device, wherein the mechanical indicator is positioned on the rear side of the mobile device in a location aligned with the one of the at least one predetermined region such that the user can identify which of the at least one predetermined region was selected based on the physical manipulation of the corresponding mechanical indicator.

11. The media of claim 10, wherein an item displayed via the touchscreen display area corresponds with the predetermined region.

12. The media of claim 11, wherein the predetermined region is identifiable to the user.

13. The media of the 12, wherein the predetermined region is associated with a particular function to be performed by the mobile device.

14. The media of the 10, wherein the touch input is provided via an object in connection with the user.

15. The media of the 10, wherein the physical manipulation of the mechanical indicator comprises a protrusion or a depression of the mechanical indicator.

16. A mobile communications device comprising:
   a touchscreen display that presents a graphical user interface that includes a plurality of predetermined regions, each of the plurality of predetermined regions being associated with an item displayed via the touchscreen display;
   one or more contact sensors that detect contact provided to a predetermined region within the touchscreen display of a front portion of the mobile communications device; and
   one or more processors that recognize the contacted predetermined region, identify a mechanical indicator corresponding with the contacted predetermined region on the front portion of the mobile communications device, wherein the mechanical indicator is positioned on the rear side of the mobile device in a location aligned with the one of the at least one predetermined region such that the user can identify which of the at least one predetermined region was selected based on the physical manipulation of the corresponding mechanical indicator.

17. The mobile communications device of claim 16, wherein the physical manipulation comprises a depression or a protrusion of the mechanical indicator.

18. The mobile communications device of claim 16, wherein the mechanical indicator resembles a button or a key.

19. The mobile communications device of claim 16, wherein each of the plurality of predetermined regions comprises an identifiable predetermined region or an unidentifiable predetermined region.

* * * * *